INVENTORS
RICHARD J. VERBA &
HOWARD V. SCHWEITZER
BY Ely, Frye & Hamilton
ATTORNEYS April 9, 1957   R. J. VERBA ET AL   2,787,979
SPRAY COATING MACHINE FOR COATING THE
INSIDES OF HOLLOW ARTICLES
Filed Nov. 23, 1953   4 Sheets-Sheet 2
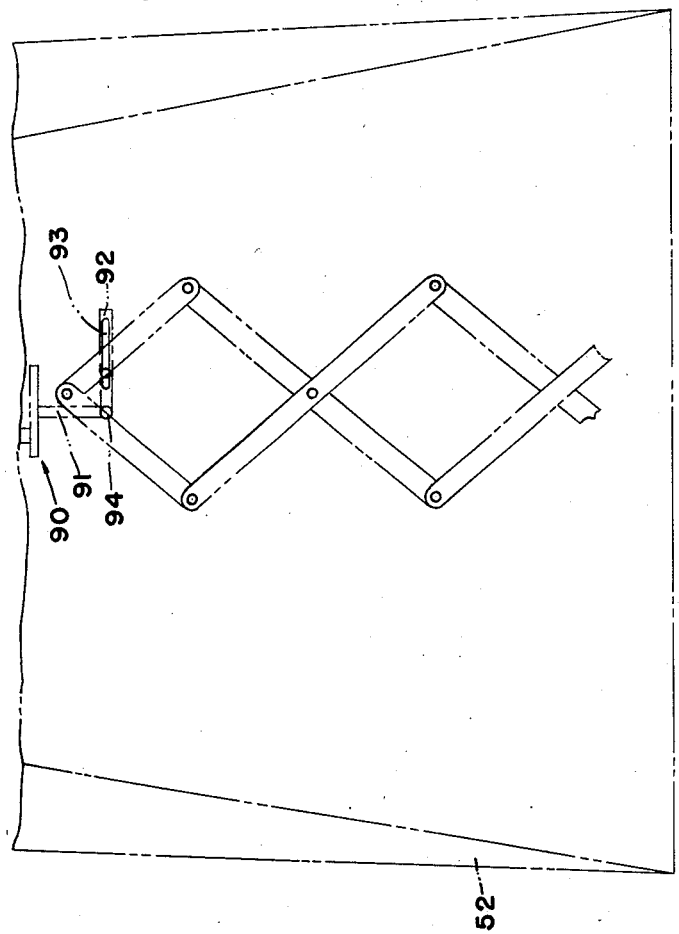
FIG. 2
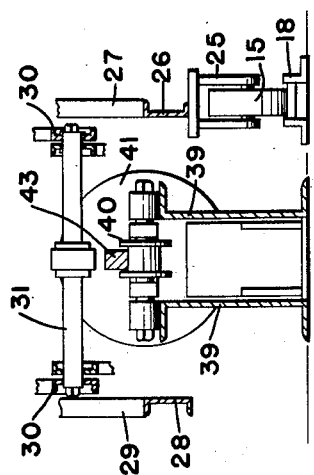
FIG. 5
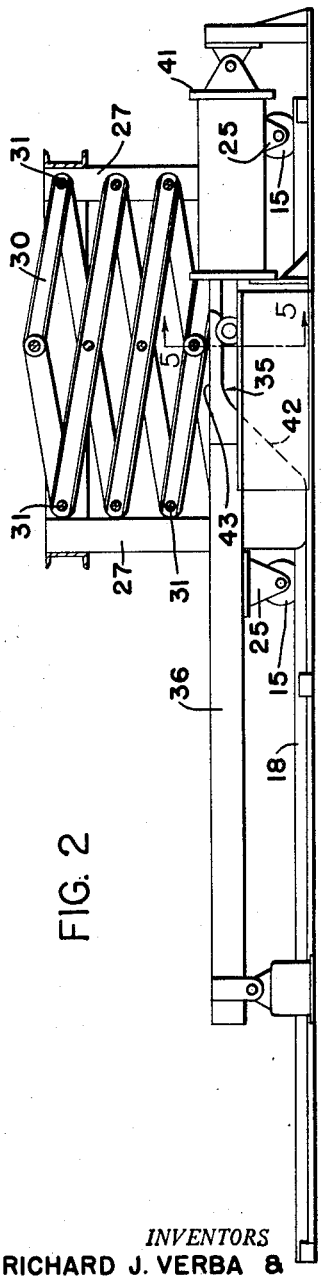
*INVENTORS*
RICHARD J. VERBA &
HOWARD V. SCHWEITZER
BY Ely, Frye & Hamilton
ATTORNEYS

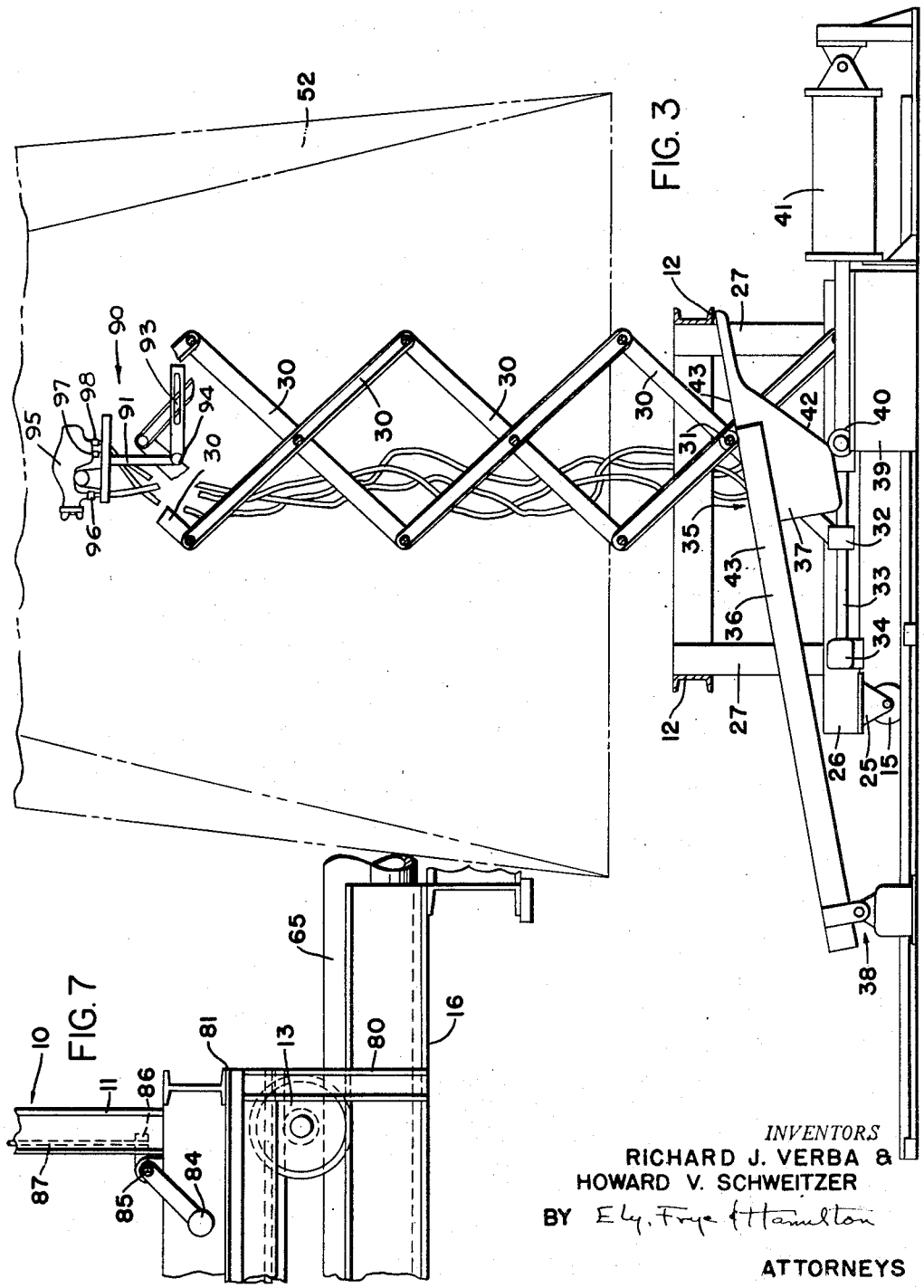

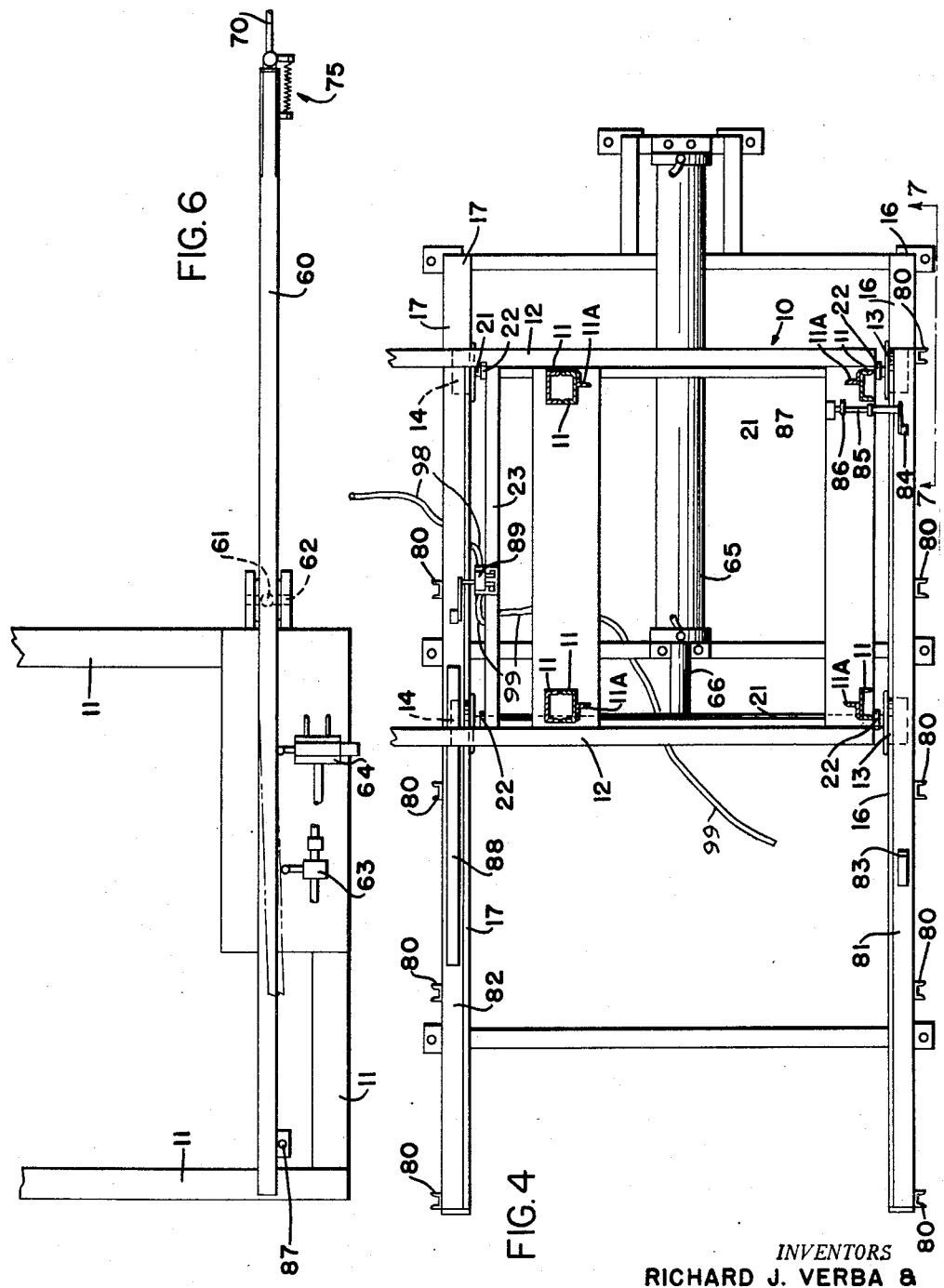

United States Patent Office 2,787,979
Patented Apr. 9, 1957

2,787,979

SPRAY COATING MACHINE FOR COATING THE INSIDES OF HOLLOW ARTICLES

Richard J. Verba, Fairview Park, Ohio, and Howard V. Schweitzer, Fort Lauderdale, Fla.; said Richard J. Verba assignor to said Howard V. Schweitzer Application November 23, 1953, Serial No. 393,638

8 Claims. (Cl. 118—318)

This invention relates to coating apparatus and more particularly to a machine for economically coating, i. e., painting, the inside of open-ended hollow bodies or arrays of hollow bodies carried along a conveyor system, such as a series of automotive hoods carried in pairs.

While the desirability of providing machines to automatically perform such inside spraying has long been obvious in view of the potentially large savings in labor, no such machines have heretofore proved fully successful because of their prohibitive cost and complexity and because of their failure to coat with a degree of evenness and uniformity equal to that of manual coating.

The invention provides a relatively simple machine which has proved highly successful for inside coating. The invention comprises a linkage which raises a spray means, usually one or more spray guns, up into the inside of the passing object or array of objects to be coated; it thereupon allows the spraying means to move along a linear path within such object or array while accommodating translatory motion of the passing object or array, and, upon completion of the coating operation, returns the machine to initial position ready to receive a succeeding object or array. Motion of the spraying means and synchronization of operation with the motion of objects carried past the painting station is accomplished with what may be termed a double-cammed, lazy-tong linkage, described in detail below. The efficiency and effectiveness of the mechanism will be apparent from the following disclosure, including the accompanying drawings; the advantages of the invention being particularly evident when it is compared to the very expensive complex mechanisms of related prior art.

In the drawings:

Figure 2 is a view taken on line 2—2 in Figure 1;

Figure 3 is a view similar to Figure 2, showing the parts in a different operative position;

Figure 4 is a view taken from line 4—4 in Figure 1;

Figure 5 is a cross-section taken along line 5—5 in Figure 2;

Figure 6 is a view taken from line 6—6 in Figure 1;

Figure 7 is a view taken from line 7—7 in Figure 4.

Figure 1:
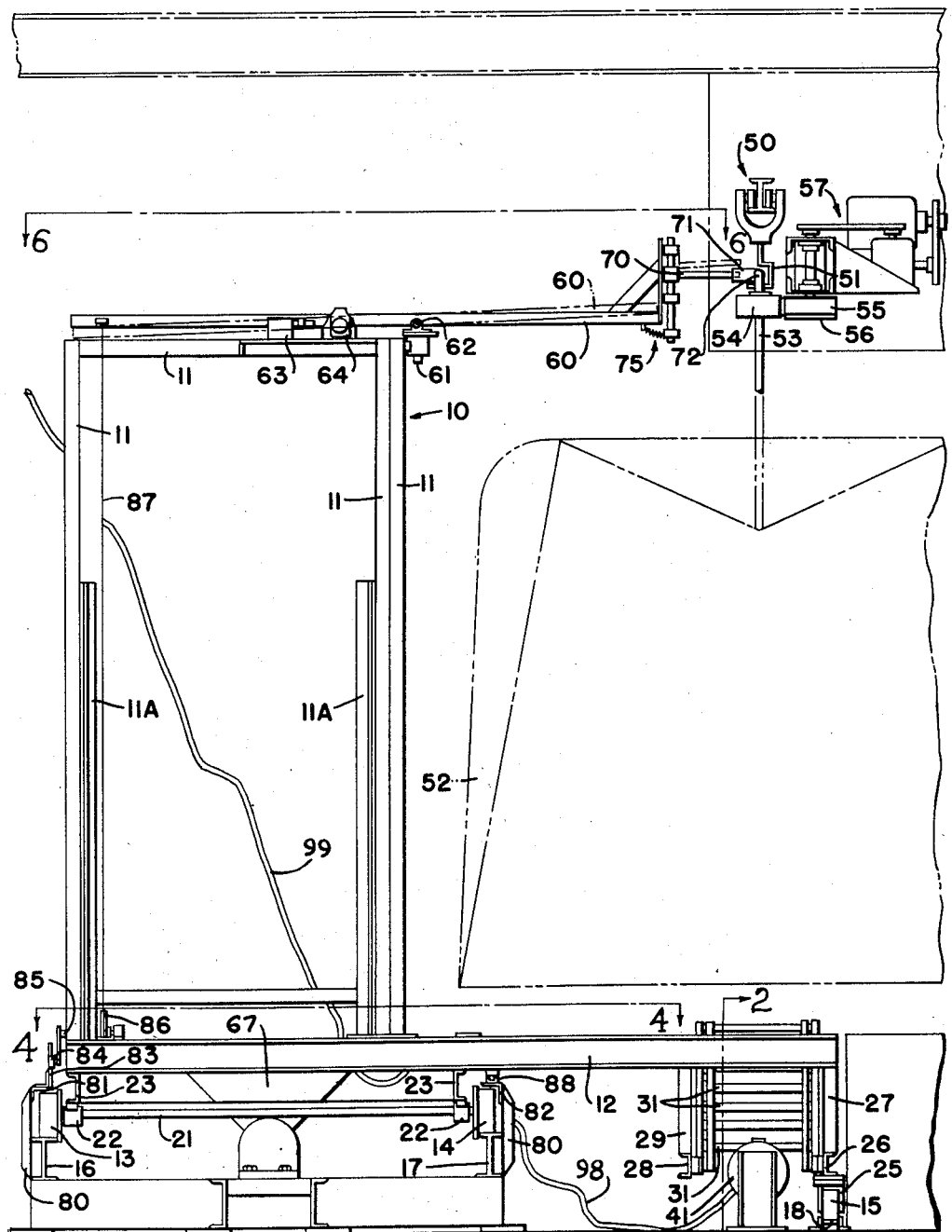
Figure 1 is a general elevation of a spray-painting installation embodying the invention.

The illustrated embodiment of the invention includes an open box-like frame generally indicated at 10 and comprising a number of suitably fabricated horizontal and vertical frame members 11 reinforced by suitable stiffeners 11A. Fixed to the bottom of the frame 10 and extending from one side thereof are the crossbeams 12. These crossbeams support the pairs of wheels 13, 14 and 15 (see Figure 1) in a manner which will be evident from the drawings. The wheels 13 and 14 are mounted on the axles 21 which are supported in the bearings 22 which, in turn, are suitably affixed to the beams 23 extending below and between the crossbeams 12. The wheels 15 are mounted in the yokes 25 which are affixed to the beam 26 which, in turn, is secured to the beams 27 depending from the crossbeams 12.

Spaced from the beam 26 is a similarly positioned beam 28 affixed to the beams 29 depending from the crossbeams 12. Between these two beams are mounted elements of a lazy-tong linkage comprising two sets of side links 30 joined at their pivot points by shafts 31 in a manner which will be apparent from the drawings. The right (as viewed in Figures 2 and 3) bottom pivot points in this linkage are pivotally mounted on the beams 28 and 29. The left bottom pivot points are pivotally connected to the sliding blocks 32, one of which may be seen in Figure 3.

Each of the sliding blocks 32 is associated with a rod 33 (only one of which may be seen in Figure 3), the rods 33 being spaced inwardly from the beams 26 and 28 by end mounting assemblies 34 (only one of which may be seen in Figure 3).

A cam assembly generally indicated at 35 and comprising the members 36 and 37 is pivotally mounted at 38 inboard of the track 18 and between the beams 26 and 28. Below the member 37 are located blocks 39 which slidably support a camming member 40 which is connected to the rod of an air cylinder 41.

It will be apparent that the camming member 40 operatively engages the bottom camming surface 42 of the member 37 and that the upper flat camming surface 43 of the cam assembly 35 is adapted to operatively engage the lowermost shaft 31 in camming relationship.

The illustrated embodiment of the invention is shown as employed in connection with an installation having an overhead conveyor generally indicated at 50 and associated with which are conveyor hangers 51 on which the pieces to be coated, schematically indicated in phantom at 52, are suspended by suitable rotatable hanger means 53 including a friction wheel 54 adapted to be contacted by a fixed track or, as illustrated, by a moving belt 55 mounted on a drive pulley 56 and an idler pulley (not shown) and powered by drive means, generally indicated at 57, in order that the work 52 may be caused to relatively rapidly rotate upon contact of the wheel 54 with the belt 55 as the work is carried by the conveyor past the painting station at which the illustrated embodiment of the invention is installed. While a fixed plate or band may be substituted for the belt 55, the motion of the conveyor itself causing the work 52 to turn, it has been found that the relatively rapid target rotation provided by a separately powered target rotating drive is desirable in order to obtain satisfactory inside coating of the work.

A long lever arm 60 is mounted across the top of the frame 10. This arm is mounted for pivotal movement about the axes of two pivot pins 61 and 62 which are normal to each other. Thus the arm 60 may pivot in a vertical plane as indicated in Figure 1 and may also pivot in a horizontal plane as indicated in Figure 6. Mounted on the frame 10 adjacent the side of the arm 60 is an air valve 63 and a hydraulic valve 64 both having control arms adapted to be actuated by horizontal pivotal movement of the arm 60 as clearly illustrated in Figure 6. The valve 64 is operatively connected to a hydraulic cylinder 65. The piston rod 66 of this hydraulic cylinder is linked to a depending member 67 which is fixed to one of the beams 12.

The valve 64 is ported to cause extension of the rod 66 when the arm 60 is in its dotted line position as shown in Figure 6 and to cause retraction of the rod 66 when the arm 60 is in its solid line position as shown in Figure 6. The valve 63 is operatively connected to the air cylinder 41 and is ported to cause advance of the camming member 40 when the arm 60 is in its dotted line position as shown in Figure 6 and to cause retraction of the camming member 40 when the arm 60 is in its solid line position as shown in Figure 6. The control arms of the valves 63 and 64 are spring loaded to urge the arm 60 to its solid line position as shown in Figure 6.

At the end of the arm 60 is a small arm 70 adapted to be contacted by actuating fingers associated with each of the passing target bodies, for instance the finger 71 associated with the target body indicated in Figure 1, the finger 71 being fixed to the non-rotating upper portion 72 of the rotatable hanger means 53. The resilient mounting of the small arm 70 on the end of the large arm 60, as generally indicated at 75 in Figures 1 and 6 is provided in order to cushion the shock of initial contact of the passing fingers 71 with the assembly.

As shown in Figure 1, several side supports 80 extending up from the outer sides of the rails 16 and 17 support a pair of beams 81 and 82 above these rails. A raised cam surface 83 is provided on the top side of the beam 81. A cam follower 84 is pivotally mounted near the bottom of the frame 10 by means of a shaft 85 to which is fixed near its inboard end a small crank arm 86. Extending between this arm and the long arm 60 is a wire cable 87 (see Figures 1, 4 and 7).

Another longer raised cam surface 88 is provided on the top side of the beam 82. This cam surface is adapted to be engaged by the follower associated with a paint gun control valve 89 mounted on the frame 10. The valve 89 is operatively connected to one or more paint guns (not shown) which are positioned on the paint gun mounting fixture located at the top of the lazy-tong linkage and generally indicated at 90 in Figure 3. This fixture comprises a mounting bracket 91 having a lower horizontal member 92 connected to one of the uppermost links 30 by a pin and slot connection 93 and to the other of the uppermost links 30 at a pivot 94. It will be evident that the lost-motion linkage afforded by the pin and slot connection is such that the mounting bracket 91 is maintained in level position at all times regardless of the relative angular position of the two uppermost links 30.

Suitable hose connections appropriate to the practice of the invention in accordance with conventional painting gun control methods may comprise the hoses 96 to 99 inclusive (see Figures 1, 3 and 6). The hose 96 leads from a source of pressurized paint (not shown) and is coupled to the paint inlet port of the paint gun 95, as shown. The hose 97 leads from a source of pressurized air (not shown) and is coupled to the atomizing air inlet port of the paint gun 95, as shown. The hose 98 leads from the controlled or outlet port of the conventional control valve 89 and is coupled to the control air inlet port of the paint gun 95, as shown. The hose 99 leads from a source of pressurized air (not shown) to the inlet port of the control valve 89. When the control valve 89 is actuated by the cam 88, the lines 99 and 98 are operatively connected, causing pressurized air to be supplied to the control air inlet port of the paint gun 95, in turn causing the gun to operate. When the control valve is not actuated by the cam 88, line 99 is shut off by the control valve 89, and the line 98 is vented to atmosphere causing the paint gun 95 to cease operating, all in accordance with conventional and familiar practice.

In order to most fully disclose the invention, the operation of the above-described specific embodiment thereof will be described through one complete cycle of operation.

As an array of work 52 carried by a rotatable hanger 53 approaches the painting station, the wheel 54 associated therewith contacts the belt 55 and the work 52 is thereby caused to rotate. After slight additional translation, the finger 71 contacts the short arm 70. The long arm 60 is thereby urged to the dotted line position shown in Figure 6. The control arm of the valve 64 is depressed by the arm 60, causing the hydraulic cylinder 65 to be actuated in the direction of extension whereby the frame 10 and all elements associated therewith are moved along the rails 16, 17 and 18 in synchronization with the translation of the work 52 along the conveyor rail.

The control arm of the valve 63 is also depressed by the arm 60, causing the air cylinder 41 and its associated linkage to quickly shift to extended position. The camming member 40 interacts with the camming surface 42 to move the cam assembly 35 to the raised position shown in Figure 3. The lowermost shaft 31 is simultaneously forced upwardly by the upper camming surface 43 causing the lazy-tong linkage to shift to extended position.

Shortly thereafter, the follower of the valve 89 rides up on the cam surface 88, causing the paint gun or guns to start operating. Paint spraying continues as the assembly moves along the direction of conveyor travel, the guns being gradually lowered as the lowermost shaft 31 moves down the slope of the upper camming surface 43. Since the work 52 is constantly rotating, it will be clear that the inside thereof is progressively coated, the relative speed of the various motions being such that paint is applied in a descending overlapping helical path.

As the paint gun or guns approach the bottom or skirt of the work 52, the follower associated with the valve 89 rides off the cam 88 causing spraying to discontinue. Shortly thereafter the follower 84 is raised by the arm 83 causing the cam 60 to be moved about its horizontal pivot to the dotted line position shown in Figure 1. The arm 70 is thus raised clear of the finger 72 allowing the arm 60 to shift about its vertical pivot to the solid line position shown in Figure 6. Flow through the valves 63 and 64 is thereupon reversed. The camming member 40 is quickly retracted by the air cylinder 41 causing the cam assembly 35 to move to a horizontal position as shown in Figure 2 and allowing the lazy-tong linkage to remain in lowered or retracted position throughout return of the general reciprocating assembly associated with the frame 10 to its initial position by the hydraulic cylinder 55, the paint gun or guns being now sufficiently low to clear the skirt of the work 52. The follower associated with the valve 89 is provided with a conventional break-arm so that this follower will not be lifted by the camming surface 88 and the paint gun or guns will not be turned on during return movement of the assembly.

When the hydraulic cylinder is fully retracted, the cycle is completed and the equipment is in position for operation with a succeeding array of work carried by the conveyor.

The specific embodiment of the invention which has been disclosed above can obviously be altered in many details. For instance, the various valves and valve control cams could be placed at different locations, as along the rail 18; the arm 60 could extend angularly upward from a different location, or another equivalent conveyor engaging and releasing member could be provided. The slope of the upper camming surface 43 of the cam assembly 35 might be reversed and the cam assembly 35 might be pivoted at the end opposite to that shown and arranged to be actuated by a suitable linkage similar to that associated with the air cylinder 41. Such an arrangement would modify gun up-and-down motion by causing a slow rise during actual coating followed by a quick drop near the end of the cycle of operation upon lowering of the equivalent of the cam assembly 35. Accordingly, the invention is not restricted to the disclosed specific embodiment but is to be defined by the following claims.

What is claimed is:

1. In a machine to coat the insides of hollow open-ended bodies passing thereby on a conveyor, a reciprocating assembly, means to reciprocate said assembly along a path parallel to the direction of conveyor movement, a lazy-tong linkage mounted on said assembly for translation over a given path between a first position and a second position when said frame is reciprocated, paint spraying means mounted on the upper end of said lazy-tong linkage, a long cam member lying along said given path, one end of said long cam member being hinged whereby the opposite end thereof may be moved between a lowered position and a raised position, said lazy-tong linkage comprising a transverse member in following contact with said long cam member to be moved vertically thereby, means to shift said long cam member between said lowered and raised positions when said lazy-tong linkage is at one of said first and second positions to cause said paint spraying means to be vertically shifted relatively rapidly, means to move said lazy-tong linkage from said first position to said second position when said long cam member is in said raised position whereby said paint spraying means is simultaneously vertically shifted relatively slowly and to move said lazy-tong linkage from said second position to said first position when said cam member is in said lowered position whereby said paint spraying means is maintained at a substantially constant vertical position during said latter movement.

2. A device as defined in claim 1 in which said reciprocating assembly comprises a framework mounted on wheels whose axes of rotation are normal to the direction of conveyor movement, said means to reciprocate said assembly comprising a two-way hydraulic cylinder operably coupled between a fixture and said framework.

3. In a coating machine, a linkage comprising two sets of lazy-tongs extending in parallel planes and transverse links extending between corresponding pivot points on said lazy-tongs, said lazy-tongs being mounted on a base for extension in a given direction, means to reciprocate said base along a path substantially normal to said given direction, cam means pivoted at one end to a fixed point, one of said transverse links being disposed for following contact with said cam means, and means to position said cam means in a first pivotal position during movement of said base along said path in a first direction and to position said cam means in a second pivotal position during movement of said base along said path in a second direction.

4. In a coating machine, a lazy-tong linkage mounted on a base for extension in a given direction, follower means affixed to said lazy-tong linkage and extending transversely to said given direction, means to reciprocate said base along a path substantially normal to said given direction, cam means pivoted at one end to a fixed point, said follower means being disposed for following contact with said cam means, and means to position said cam means in a first pivotal position during movement of said base along said path in a first direction and to position said cam means in a second pivotal position during movement of said base along said path in a second direction.

5. In a coating machine, a lazy-tong linkage mounted on a base for extension in a given direction, paint spraying means mounted at the outer end of said lazy-tong linkage, follower means affixed to said lazy-tong linkage and extending transversely to said given direction, means to reciprocate said base over a path substantially normal to said given direction, cam means extending along said path, said follower means being disposed for following contact with said cam means, means to position said cam means in a first position during movement of said base along said path in a first direction and to position said cam means in a second position during movement of said base along said path in a second direction, and means to operate said paint spraying means only during movement of said base along said path in said first direction.

6. In a coating machine, a linkage comprising two sets of lazy-tongs extending in parallel planes and transverse links extending between corresponding pivot points on said lazy-tongs, said lazy-tongs being mounted on a base for extension in a given direction, paint spray means mounted on said lazy-tongs at the outer ends thereof, means to reciprocate said base over a path substantially normal to said given direction, cam means extending along said path, one of said transverse links being disposed for following engagement with said cam means, means to position said cam means in a first position during movement of said base along said path in a first direction and to position said cam means in a second position during movement of said base along said path in a second direction, and means to operate said paint spraying means only during said movement of said base along said path in said first direction.

7. In a machine to coat the insides of hollow open-ended bodies passing thereby on a conveyor, a reciprocating assembly, means to reciprocate said assembly along a path parallel to the direction of conveyor movement, a lazy-tong linkage mounted on said assembly for movement over a given path between a first position and a second position when said frame is reciprocated, paint spraying means mounted on the upper end of said lazy-tong linkage, a cam member lying along said given path, means to move said cam member between a lowered position and a raised position, said lazy-tong linkage comprising a transverse member in following engagement with said cam member to be moved vertically thereby, means to shift said cam member between said lowered and raised positions when said lazy-tong linkage is at one of said first and second positions to cause said paint spraying means to be vertically shifted relatively rapidly, means to move said lazy-tong linkage from said first position to said second position when said long cam member is in said raised position whereby said paint spraying means is simultaneously vertically shifted relatively slowly and to move said lazy-tong linkage from said second position to said first position when said cam member is in said lowered position whereby said paint spraying means is maintained at a substantially constant vertical position during said latter movement, and means to operate said paint spraying means only during the said relatively slow vertical shifting of said paint spraying means.

8. A device as claimed in claim 7 in which said reciprocating assembly comprises a framework mounted on wheels whose axes of rotation are normal to the direction of conveyor movement, said means to reciprocate said assembly comprising a two-way hydraulic cylinder operably coupled between a fixture and said framework.

References Cited in the file of this patent

UNITED STATES PATENTS

| | | |
|---|---|---|
| 222,882 | Ellithorp | Dec. 23, 1879 |
| 1,625,123 | Horten | Apr. 19, 1927 |
| 2,383,023 | Sykes et al. | Aug. 21, 1945 |
| 2,461,657 | Paasche | Feb. 15, 1949 |
| 2,500,660 | Chappen | Mar. 14, 1950 |
| 2,547,884 | Paasche | Apr. 3, 1951 |
| 2,586,651 | Herzog | Feb. 19, 1952 |
| 2,646,769 | Lindsay | July 28, 1953 |
| 2,660,978 | Dyne et al. | Dec. 1, 1953 |